(12) United States Patent
Plha et al.

(10) Patent No.: US 9,327,367 B2
(45) Date of Patent: May 3, 2016

(54) DEVICE AND METHOD FOR GUIDING BANDS TO BE JOINED TO ONE ANOTHER ALONG THEIR LONGITUDINAL EDGES

(75) Inventors: Jens Plha, Düsseldorf (DE); Walter Mühlhause, Geldern (DE); Stefan Wischmann, Berlin (DE)

(73) Assignee: WISCO Tailored Blanks GmbH, Duisburg (DE)

( * ) Notice: Subject to any disclaimer, the term of this patent is extended or adjusted under 35 U.S.C. 154(b) by 0 days.

(21) Appl. No.: 13/574,887

(22) PCT Filed: Jan. 12, 2011

(86) PCT No.: PCT/EP2011/050296
§ 371 (c)(1),
(2), (4) Date: Nov. 8, 2012

(87) PCT Pub. No.: WO2011/089044
PCT Pub. Date: Jul. 28, 2011

(65) Prior Publication Data
US 2013/0193181 A1   Aug. 1, 2013

(30) Foreign Application Priority Data

Jan. 25, 2010 (DE) .......................... 10 2010 005 757

(51) Int. Cl.
*B23K 37/04* (2006.01)
*B21C 47/34* (2006.01)
*B23K 26/26* (2014.01)

(52) U.S. Cl.
CPC ................. *B23K 37/04* (2013.01); *B21C 47/34* (2013.01); *B21C 47/3416* (2013.01); *B23K 26/26* (2013.01); *B23K 2201/16* (2013.01)

(58) Field of Classification Search
USPC ................................ 228/4.1, 47.1, 49.1, 49.4
See application file for complete search history.

(56) References Cited

U.S. PATENT DOCUMENTS

| 2,827,809 | A | * | 3/1958 | Beam | 228/4.1 |
|---|---|---|---|---|---|
| 2,978,805 | A | * | 4/1961 | Greenberger | 228/149 |
| 3,325,623 | A | * | 6/1967 | Briggs, III | 219/102 |
| 3,420,976 | A | * | 1/1969 | Morton et al. | 219/102 |
| 3,577,627 | A | * | 5/1971 | Woodward | 29/464 |
| 3,647,131 | A | * | 3/1972 | Hahne | 228/5.1 |
| 3,650,455 | A | * | 3/1972 | Rutter et al. | 228/6.1 |

(Continued)

FOREIGN PATENT DOCUMENTS

| CN | 100471614 | 3/2009 |
|---|---|---|
| DE | 4215252 A1 | 11/1993 |

(Continued)

*Primary Examiner* — Devang R Patel
(74) *Attorney, Agent, or Firm* — The Webb Law Firm

(57) ABSTRACT

The invention relates to a method and a device for guiding bands to be joined to one another along their longitudinal edges, comprising guide elements which form tracks for guiding the bands that are configured such that the bands approach one another in the transport direction and the longitudinal edges thereof rest on one another at a non-overlapping contact point. At least one of the tracks may be configured to undulate with a wavelength of $\frac{1}{4} \leq \lambda \leq 2$, such that transverse displacement of the band guided thereon occurs. The axes of rotation and/or longitudinal central axes of the guide elements may also be inclined towards one another at different angles of inclination in relation to a horizontal plane of reference, such that the band guided on said track is rotated about its longitudinal axis in the transport direction.

12 Claims, 3 Drawing Sheets

(56) References Cited

U.S. PATENT DOCUMENTS

| | | | | |
|---|---|---|---|---|
| 3,860,781 A | * | 1/1975 | Aschauer et al. | 219/83 |
| 4,733,815 A | | 3/1988 | Sturm | |
| 5,364,006 A | * | 11/1994 | Gilles et al. | 228/4.1 |
| 2006/0151291 A1 | * | 7/2006 | Kai et al. | 198/415 |

FOREIGN PATENT DOCUMENTS

| | | | |
|---|---|---|---|
| DE | 10331023 A1 | | 2/2005 |
| EP | 0234346 B1 | | 1/1991 |
| JP | 62-203679 A | | 9/1987 |
| JP | 11285874 A | * | 10/1999 |
| JP | 2001-225192 A | | 8/2001 |
| JP | 2002205193 A | | 7/2002 |
| JP | 2002-263864 A | | 9/2002 |
| JP | 2002292493 A | * | 10/2002 |
| JP | 2006-192444 A | | 7/2006 |

* cited by examiner

DEVICE AND METHOD FOR GUIDING BANDS TO BE JOINED TO ONE ANOTHER ALONG THEIR LONGITUDINAL EDGES

BACKGROUND OF THE INVENTION

1. Field of the Invention

The invention relates to a device for guiding bands to be joined to one another along their longitudinal edges, comprising guide elements which form a first track for guiding a first band of the bands to be joined, and guide elements which form a second track for guiding a second band to be joined along one of the longitudinal edges of the first band, the tracks being configured in such a way that the bands guided thereon approach one another in the transport direction and the longitudinal edges thereof to be joined to one another rest on one another from a contact point without a gap and without an overlap. In particular, the invention relates to a method for guiding bands to be joined to one another along their longitudinal edges, in which bands extending substantially in parallel with spacing from one another are guided via guide elements which form a first track and guide elements which form a second track to a joining point in such a way that the bands guided on the tracks approach one another in the transport direction and the longitudinal edges thereof to be joined to one another rest on one another from a contact point without a gap and without an overlap.

2. Description of the Related Art

In welding systems for producing non-continuous or continuous bands made of two or more bands, the need generally exists in terms of the method for a wedge-shaped joining angle (feed angle) between the bands to be joined to one another along their longitudinal edges, with subsequent parallelism of the longitudinal edges behind the joining point.

Various devices for guiding bands are known, in which flat bands with a different thickness, width and/or material quality can be welded edge to edge along their longitudinal edges to form non-continuous or continuous bands.

A device for guiding steel bands and for continuous butt-joining along their longitudinal edges by means of laser welding is disclosed in JP 11285874 A. In this case, two steel bands are guided in such a way that they approach one another with the formation of a wedge-shaped joining or feed angle in the same transport plane and their longitudinal edges to be welded to one another rest on one another from the contact point without a gap and without an overlap. For this purpose, the device for each of the two bands has a plurality of transport rollers before the weld position, which define a common transport plane. Furthermore, a first horizontal guide element is provided, on which a first of the two bands rests with its longitudinal edge to be welded, this first band being guided by a further (first) horizontal guide element, which presses against the outer longitudinal edge, not to be welded, of the band, onto the axis extending through the weld position. Shortly before the contact point of the two bands, the longitudinal edge to be welded of the other or second band is pressed by means of a further or second horizontal guide element, which presses against the outer longitudinal edge, not to be welded, of the second band, against the longitudinal edge to be welded of the first band. In addition, at least one of the last transport rollers before the contact point of the two bands can be oriented obliquely with respect to the running direction of the band in order to direct the band against the other band.

SUMMARY OF THE INVENTION

The object of present invention is to disclose a device and a method of the type mentioned at the outset, which make it possible to produce the necessary wedge-shaped joining angle (opening angle) even when joining relatively thick and/or high-strength bands, without plastic deformation of one of the bands occurring in the process.

The device according to one embodiment of the invention wherein at least one of the tracks thereof is configured to be undulating with a wavelength of $\frac{1}{4} \leq \lambda \leq 2$, in such a way that transverse displacement of the band guided thereon occurs, the axes of rotation or longitudinal axes of a plurality of successive guide elements of the undulating track being inclined towards the other track at different angles of inclination in relation to a horizontal plane of reference, in such a way that the band guided on said other track is rotated about its longitudinal axis.

By guiding the band in an undulating manner and simultaneously rotating said band, the necessary wedge-shaped joining angle (opening angle) can be produced even when joining relatively thick and/or high-strength bands, without plastic deformation of each band occurring.

The guide elements allow for relative movement. Suitable guide elements within the meaning of the present invention are plain bearings and/or rollers, in particular transport rollers, but also rotatably mounted balls, etc.

Preferably, each of the at least two tracks of the device according to the invention are configured to be undulating with a wavelength of $\frac{1}{4} \leq \lambda \leq 2$, in such a way that transverse displacement of the band guided on the respective track occurs, the axes of rotation or longitudinal central axes of a plurality of successive guide elements of each undulating track being inclined towards the other track at different angles of inclination in relation to a horizontal plane of reference, in such a way that the band is rotated in the transport direction. This configuration makes it possible to set a relatively large wedge-shaped joining angle between the longitudinal edges of the bands to be joined to one another, without plastic deformation thereof occurring.

An advantageous configuration of the band guidance device according to the invention is characterised in that the undulating tracks are configured in such a way that opposed or synchronous transverse displacements of the bands to be joined to one another along their longitudinal edges occur. The opposed configuration makes possible an overlapping and thus more compact arrangement of the adjacent tracks, in particular roller tracks. The synchronous configuration can lead to an increase in the joining angle.

A further advantageous configuration of the device according to the invention is that a plurality of successive guide elements of the track or tracks are provided with adjustment means, using which the height and/or the angle of inclination of the axis of rotation or longitudinal central axis of each guide element can be adjusted in relation to a horizontal plane of reference and, if necessary, vertically thereto. This configuration makes it possible to adjust or adapt the wedge-shaped joining angle which is specified by the band edges to be joined to one another as a function of the thickness, width and/or quality of the bands.

In order to be able to optimally adjust the wedge-shaped joining angle as a function of the thickness, width and/or quality of the bands, without plastic deformation of the bands occurring, it is provided according to a further configuration of the device according to the invention that the respective guide element is rotatably mounted in a holder which is supported on at least two lifting elements, preferably lifting spindles, which are horizontally spaced apart from one another.

The heights and the angles of inclination of the axes of rotation and longitudinal central axes of the individual guide elements can be rapidly and easily adjusted if, according to a further advantageous configuration, the lifting elements are provided with electromotive, hydraulic or pneumatic drives and q remote control, preferably a programmable remote control, is available, by means of which the drives can be controlled and/or regulated individually or as a group.

In accordance with the device, the method according to one embodiment of the invention is characterised in that at least one of the tracks is configured to be undulating with a wavelength of $¼ ≤ λ ≤ 2$, in such a way that transverse displacement of the band guided thereon occurs, the axes of rotation or longitudinal central axes of a plurality of successive guide elements of the undulating track being inclined towards the other track at different angles of inclination in relation to a horizontal plane of reference, in such a way that the band in question is rotated about its longitudinal axis in the transport direction.

Each of the tracks is preferably configured to be undulating with a wavelength of $¼ ≤ λ ≤ 2$, in such a way that transverse displacement of each band occurs, the axes of rotation and/or longitudinal central axes of a plurality of successive guide elements of each undulating track being inclined towards the other track at different angles of inclination in relation to a horizontal plane of reference, in such a way that each band is rotated in the transport direction.

In order for the band guidance according to the invention to be carried out as compactly as possible, the undulating tracks are preferably configured in such a way that opposed transverse displacements of the bands to be joined to one another along their longitudinal edges occur. If the joining angle is to be increased, then the undulating tracks are configured to be synchronous.

Furthermore, the invention provides that the heights and/or the angles of inclination of the axes of rotation of a plurality of successive guide elements of at least one of the tracks can be adjusted in relation to a horizontal plane of reference and, if necessary, vertically thereto, as a function of the thickness, width and/or quality of the band guided on said track, in order to vary the feed angle (joining angle) defined by the longitudinal edges of the bands which face one another.

If the welding takes place using a laser, it must be ensured that a technical zero gap is adjusted. Alternatively, the welding can also take place by means of high frequency. For this purpose, however, a defined force has to be applied at the contact point of the longitudinal edges to be welded, to ensure a perfect material connection of the edges to be connected. The defined force to be applied may be determined as necessary and is, in particular, to be adapted to the material to be welded. The defined force maximally corresponds to the yield strength of the materials to be welded at room temperature, care having to be taken that the yield strength in the zone of heat influence decreases as the temperature increases in order to ensure a real zero gap.

The band guidance according to the invention makes it possible to guide the bands continuously joined to one another onwards in a tension-free and mutually parallel manner and at a common transport height or in a common transport plane. However, it is also conceivable to apply a tensile force to the band or bands. If required, a prepositioning of the bands or band may take place in order to compensate band imprecisions.

BRIEF DESCRIPTION OF THE DRAWINGS

The invention will be described in more detail below with reference to drawings showing an embodiment, in which, schematically.

DETAILED DESCRIPTION OF THE INVENTION

Figure 1:
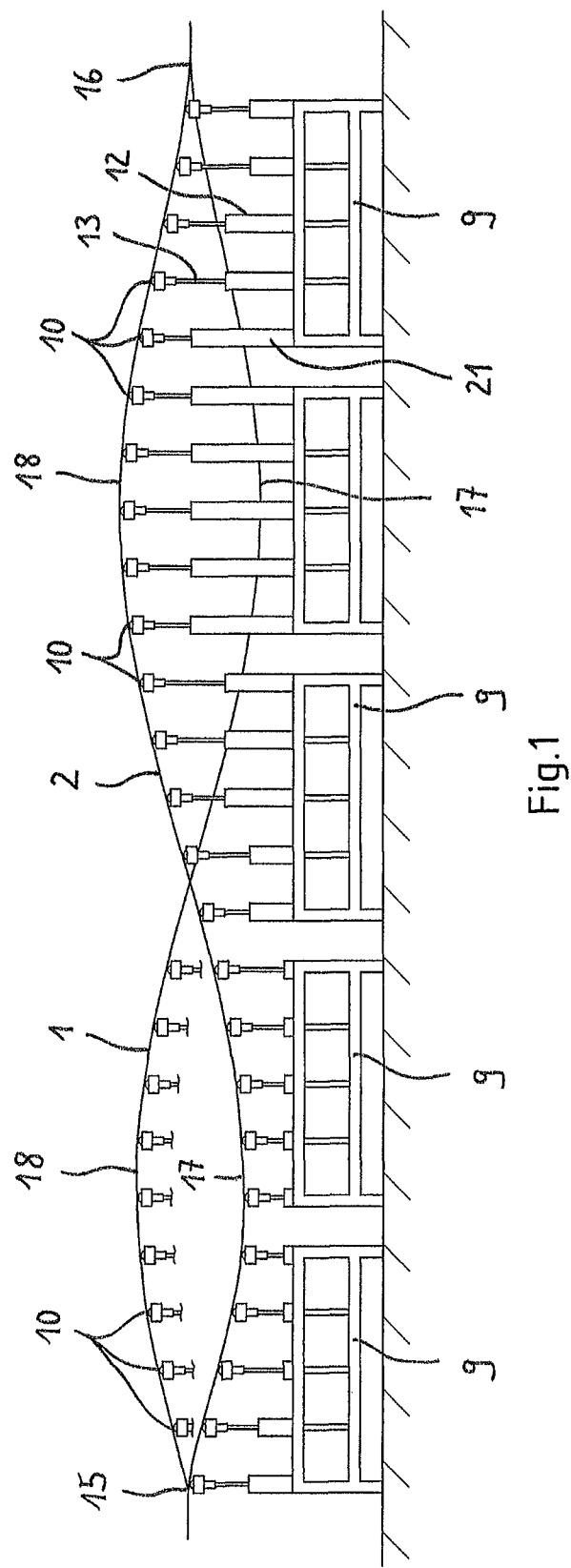
FIG. 1 is a side view of a band guidance device according to the invention.

The device shown in the drawings serves to guide metal bands 1, 2, for example steel bands, which are to be joined, preferably welded, to a non-continuous or continuous band 5 along their longitudinal edges 3, 4. The bands 1, 2 are unwound from coils in reeling stations (not shown) and fed, initially extending mutually parallel, to the band guidance device.

Figure 2:
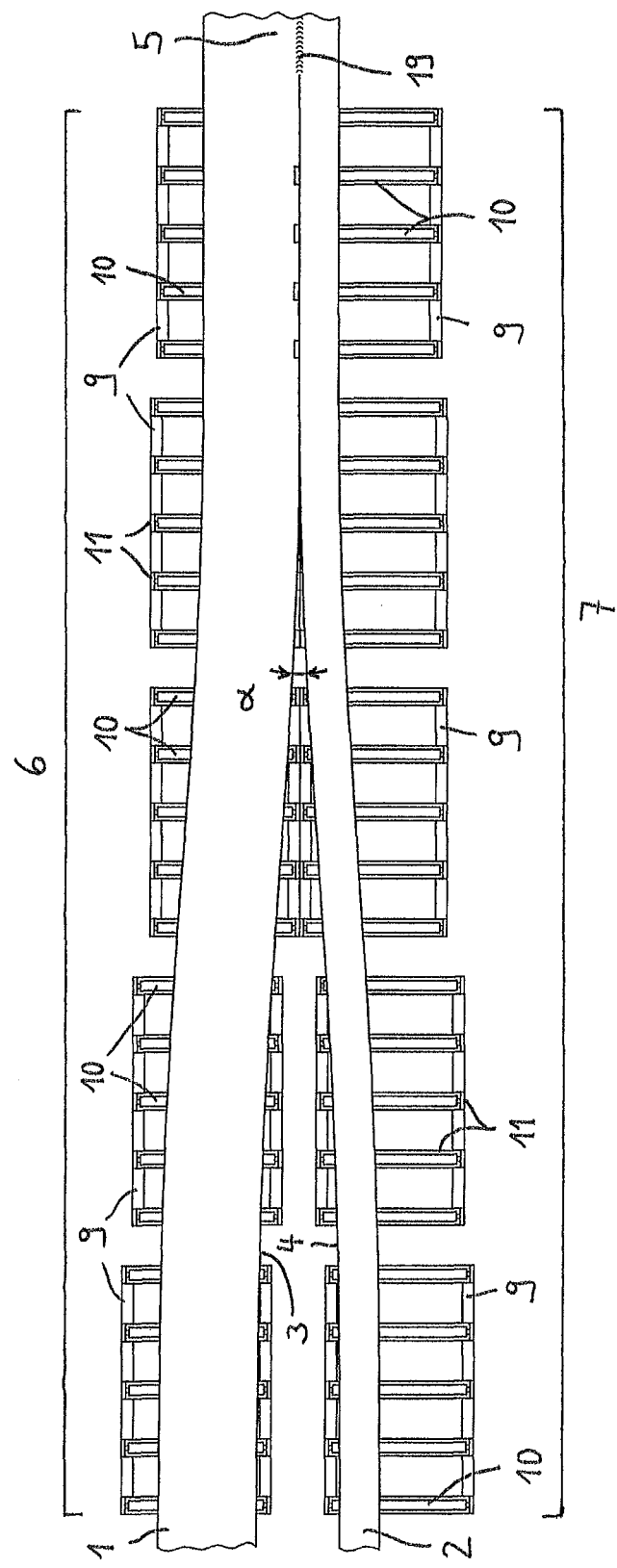
FIG. 2 is a plan view of the band guidance device of FIG. 1.

In the embodiment shown, the bands 1, 2 are of different widths. The band 1 is wider than the band 2 (cf. FIG. 2). Additionally or alternatively, the bands 1, 2 can also differ in thickness and/or quality, in particular in hardness and yield strength.

The device according to one embodiment of the invention comprises a first roller track 6 and at least one additional or second roller track 7. Each roller track 6, 7 is formed from a plurality of supporting structures or frames 9, in which transport rollers 10 are rotatably mounted. The axes of rotation of the transport rollers 10 extend substantially mutually parallel. In the embodiment shown, each of the frames 9 has the same number of transport rollers 10. Each transport roller 10 is rotatably mounted in a holder 11 which is supported on two lifting elements 12 carried by the frame (supporting structure) 9. The lifting elements 12 of each transport roller holder 11 are horizontally spaced apart from one another and preferably consist of substantially vertically extending hydraulic cylinders or lifting spindles 13, the upper ends 14 of which are connected to the associated transport roller holder 11 in an articulated manner on one side and via a movable bearing or a plain bearing on the other side.

In the example shown, each of the roller tracks 6, 7 is formed from five frames 9. The frames 9 are arranged relative to one another in such a way that the distance from the frames 9 of one roller track 6 to the frames 9 of the other roller track 7 decreases gradually from the inlet point (feed point) 15 of the bands 1, 2 on the first pair of frames to the joining point (welding point) 16. The axes of rotation of the first transport rollers 10 at the inlet point 15 of the first pair of frames 9 and the axes of rotation of the final transport rollers 10 before the joining point 16 are oriented substantially horizontally. The transport rollers 10 of each roller track 6, 7 are arranged at different heights between the inlet point 15 and the joining point 16, and specifically in such a way that transverse displacement of the band 1 or 2 guided on each roller track 6, 7 occurs with a downwardly extending antinode 17 and an upwardly extending antinode 18. In this example, the wavelength is $λ=1$. For clarity, only part of the transport rollers 10 guiding the rear band 1 is shown in FIG. 1. The heights of the transport rollers 10 of each roller track 6, 7 are selected in such a way that a substantially or almost harmonic or sinusoidal wave (oscillation) of the band 1, 2 guided thereon occurs (cf. FIG. 1). The length of the first antinode viewed in the running direction of the band is, in this case, preferably shorter than the length of the following antinode. The difference in length is at least 15%, preferably at least 25%. Additionally, the axes of rotation of a plurality of successive transport rollers 10 of each roller track 6, 7 are inclined towards the other roller track 6 or 7 between the inlet point 15 and the joining point 16 at different angles of inclination in relation to a horizontal plane of reference, in such a way that each band 1, 2 is slightly rotated about its longitudinal axis and the band edges 3, 4 to be joined or to be welded approach one another in the running direction of the band and touch before or at the joining point 16. The welding or joining seam is denoted by reference numeral 19 in FIG. 2.

By adjusting the height and angle of inclination of the individual transport rollers 10, different feed angles and/or overlaps of the bands 1, 2 can be produced. The heights and/or angles of inclination of the axes of rotation of a plurality of successive transport rollers 10 of each roller track 6, 7 are adjusted in relation to a horizontal plane of reference as a function of the thickness, width and/or quality of the band 1, 2 guided on said track, in order to vary the feed angle α defined by the longitudinal edges 3, 4 of the bands 1, 2 which face one another. For this purpose, each transport roller 10 of the band guidance frame 9 is provided with an adjustment means, using which the height and the angle of inclination of the axis of rotation of each transport roller 10 can be adjusted in relation to a horizontal plane of reference and, if necessary, vertically thereto.

The adjustment means comprises the above-mentioned lifting elements 12 which preferably consist of toothed racks or threaded rods or lifting spindles 13. The lifting elements 12 associated with the individual transport roller 10 are adjustable largely mutually independently, in such a way that there are sufficient degrees of freedom for the adjustment of the inclination of the axis of rotation of the transport roller.

Figure 3:
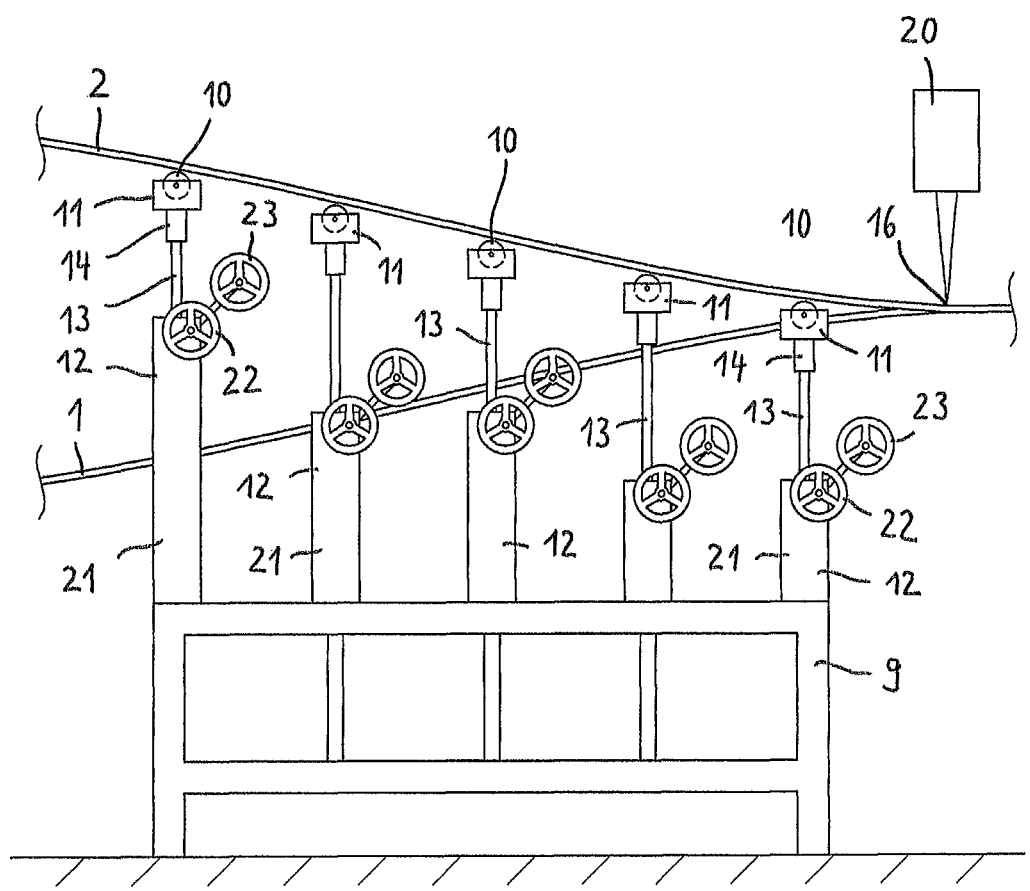
FIG. 3 is an enlarged side view of a detail of the band guidance device in front of a welding means.

A transport roller frame 9 is shown schematically in FIG. 3, which guides the front or right-hand band 2 viewed in the running direction of the band and is arranged in front of the joining point 16 as the last frame of the frames of the roller track 7. A welding device, for example a laser welding device, for continuously welding the bands 1, 2 is denoted by reference numeral 20. Here, it has to be ensured that there is a technical gap. The use of a high frequency welding device is conceivable as an alternative. It then has to be ensured that there is a real zero gap which is adjusted at the contact point of the longitudinal edges to be welded by means of a defined force. Each lifting element 12 comprises a toothed rack or threaded rod (lifting spindle) 13 which is held in a vertical guide 21. The toothed rack or threaded rod 13 meshes with a gear drive which can be actuated by means of a hand wheel 22, 23 for lifting or lowering the toothed rack or threaded rod 13. Two hand wheels 22, 23 are arranged on each front lifting element 12 in FIG. 3, the second hand wheel 23 actuating a rear gear drive which is associated with the rear toothed rack or threaded rod, which cannot be seen in the side view of FIG. 3.

Within the scope of the invention, instead of a hand wheel 22, 23, each lifting element 12 can also be provided with an electromotive, hydraulic or pneumatic drive, the drives of the lifting elements 12 then being able to be controlled and/or regulated individually or as a group by means of remote control.

By means of the band guidance, in which the bands 1, 2 which initially extend mutually parallel and are spaced apart from one another are fed with simultaneous rotation, each being in the form of a wave before joining (welding), preferably a harmonic wave having a wavelength $\lambda=1$, the required deflection, which makes possible the lateral joining of the initially spaced apart band edges 3, 4, is produced from the lower antinode (wave trough) 17 and the upper antinode (wave peak) 18. This band guidance simultaneously causes the bands 1, 2 which are welded or joined to one another to be guided onwards in a mutually parallel and tension-free manner from the joining point 16 at the same transport height.

The roller tracks 6, 7 of the band guidance device are preferably configured or adjusted in such a way that opposed transverse displacements of the bands 1, 2 to be joined to one another occur. As shown in FIG. 1, the (front) band 2, from the inlet point 15 of the roller track 7, initially carries out a downwardly extending curved movement which then transitions into an upwardly extending movement in an undulating manner and, after reaching the highest point of the wave peak 18, transitions into a downwardly extending curved movement again. In contrast, the other band 1, from the inlet point 15 of the roller track 6, initially carries out an upwardly extending movement in an undulating manner, which, after reaching the highest point of the wave peak 18, transitions into a downwardly extending curved movement and, after reaching the lowest point of the wave trough 17, transitions into an upwardly extending curved movement again. This opposed wave-like band guidance is not necessarily required for the configuration of the present invention, however is advantageous in terms of space and implementation. It can be seen in FIG. 2 that the opposed wave-like band guidance makes possible an overlapping arrangement of the frames 9 or the transport rollers 10 before the joining point.

The implementation of the invention is not restricted to the above-described embodiment which is shown in the drawings. Rather, a plurality of variants are conceivable which, also in an essentially different form, make use of the invention outlined in the appended claims. The device according to the invention can thus for example comprise more than two roller tracks 6, 7 arranged mutually parallel. In certain circumstances, it may also be sufficient for only one of the bands 1, 2 to be guided in an undulating manner and to be simultaneously rotated in order to introduce it at its longitudinal edge 3 or 4 to the longitudinal edge 4 or 3 of a second band and, after welding, to guide it onwards parallel to said second band in particular in a tension-free manner. Furthermore, it is within the scope of the invention to guide each band in such a way that transverse displacement thereof occurs during simultaneous rotation, the wavelength corresponding to $\frac{1}{4} \leq \lambda \leq 2$, preferably $\frac{1}{4} \leq \lambda \leq 1$.

The invention claimed is:

1. A device for guiding bands to be joined to one another along their longitudinal edges, comprising guide elements which form a first track for guiding a first band of the bands to be joined, and guide elements which form a second track for guiding a second band to be joined along one of the longitudinal edges of the first band, wherein the tracks are configured such that the bands guided thereon approach one another in direction of transport and the longitudinal edges thereof to be joined to one another rest on one another at a non-overlapping contact point, wherein at least one of the tracks is formed from a plurality of supporting frames, each supporting frame comprising a plurality of transport rollers mounted on lifting elements at varying heights such that at least one of the tracks is configured to be undulating with a wavelength of $\frac{1}{4} \leq \lambda \leq 2$ and transverse displacement of the band guided thereon occurs, wherein the axes of rotation or the longitudinal central axes of a plurality of successive guide elements of the undulating track are inclined towards the other track at different angles of inclination in relation to a horizontal plane of reference, such that the band guided on said track is rotated about its longitudinal axis, and wherein the plurality of successive guide elements forming at least one of the first track and the second track are adjustable such that a height of each guide element can be adjusted in a vertical direction and an angle of inclination of the axes of rotation or the longitudinal central axes of the plurality of successive guide elements can be adjusted in relation to a horizontal plane of reference to adjust a feed angle between the first band and the second band as they approach the contact point.

2. The device according to claim 1, wherein each track is configured to be undulating with a wavelength of $\frac{1}{4} \leq \lambda \leq 2$, such that transverse displacement of the band guided on the respective track occurs, and wherein the axes of rotation or the longitudinal central axes of a plurality of successive guide elements of each undulating track are inclined towards the other track at different angles of inclination in relation to a horizontal plane of reference, such that the band guided on said track is rotated about its longitudinal axis.

3. The device according to claim 2, wherein the undulating tracks are configured such that opposed or synchronous transverse displacements of the bands to be joined to one another along their longitudinal edges occur.

4. The device according to claim 1, wherein each guide element of the track or tracks is rotatably mounted in a holder which is supported on at least two lifting elements.

5. The device according to claim 4, wherein the lifting elements are provided with electromotive, hydraulic or pneumatic drives, and wherein said drives can be controlled, regulated, or both controlled and regulated remotely.

6. A method for guiding bands to be joined to one another along their longitudinal edges comprising:
guiding the bands that extend substantially in parallel via guide elements which form a first track and guide elements which form a second track to a joining point such that the bands guided on the tracks approach one another in direction of transport and the longitudinal edges thereof to be joined to one another rest on one another at a non-overlapping contact point,
forming at least one of the tracks from a plurality of supporting frames, each supporting frame comprising a plurality of transport rollers mounted on lifting elements at varying heights such that at least one of the tracks undulates with a wavelength of $\frac{1}{4} \leq \lambda \leq 2$ and transverse displacement of the band guided thereon occurs, and
adjusting a feed angle between the first band and the second band as they approach the contact point, wherein a height of at least one of the guide elements can be adjusted in a vertical direction and the axes of rotation or the longitudinal central axes of a plurality of successive guide elements of the undulating track can be adjusted towards the other track at different angles of inclination in relation to a horizontal plane of reference, such that the band guided on the undulating track is rotated about its longitudinal axis in the transport direction, and
wherein the plurality of successive guide elements of the undulating track are adjustable in a vertical direction.

7. The method according to claim 6, further comprising:
configuring each of the two tracks to undulate with a wavelength of $\frac{1}{4} \leq \lambda \leq 2$, such that transverse displacement of each band guided thereon occurs.

8. The method according to claim 7, further comprising:
configuring the undulating tracks such that opposed or synchronous transverse displacements of the bands to be joined to one another along their longitudinal edges occurs.

9. The method according to claim 6, further comprising:
adjusting the height or the angle of inclination of the axes of rotation or the longitudinal central axes, of a plurality of successive guide elements of at least one of the tracks in relation to a horizontal plane of reference and optionally, vertically thereto, as a function of the thickness, width, quality or a combination thereof of the band guided on said track, in order to vary the feed angle ($\alpha$) defined by the longitudinal edges of the bands.

10. The method according to claim 6, further comprising:
changing the axes of rotation or the longitudinal central axes of a plurality of successive guide elements such that a defined force is adjusted at the longitudinal edges of the bands which abut against one another.

11. The device according to claim 2, wherein the heights of the guide elements are adjusted such that the wave trough of the first track corresponds to the wave peak of the second track.

12. The method according to claim 7, wherein the heights of the guide elements are adjusted such that the wave trough of the first track corresponds to the wave peak of the second track.

* * * * *